United States Patent
Pu et al.

(10) Patent No.: US 11,775,483 B2
(45) Date of Patent: Oct. 3, 2023

(54) CLUSTERING STORAGE SYSTEMS FOR SHARING OF DATA PATTERNS USED FOR DEDUPLICATION

(71) Applicant: Dell Products L.P., Round Rock, TX (US)

(72) Inventors: Weilan Pu, Chengdu (CN); Jian Kang, Chengdu (CN); Chi Chen, Chengdu (CN); Wen Chen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 17/136,484

(22) Filed: Dec. 29, 2020

(65) Prior Publication Data

US 2022/0179830 A1 Jun. 9, 2022

(30) Foreign Application Priority Data

Dec. 9, 2020 (CN) .......................... 202011461983.0

(51) Int. Cl.
*G06F 16/00* (2019.01)
*G06F 16/174* (2019.01)
*G06F 16/28* (2019.01)

(52) U.S. Cl.
CPC ........ *G06F 16/1748* (2019.01); *G06F 16/285* (2019.01)

(58) Field of Classification Search
CPC .......................... G06F 16/1748; G06F 16/285
USPC .................................................. 707/600–899
See application file for complete search history.

(56) References Cited

U.S. PATENT DOCUMENTS

| | | | | |
|---|---|---|---|---|
| 9,152,333 | B1* | 10/2015 | Johnston | ................. G06F 3/067 |
| 10,303,797 | B1* | 5/2019 | Menezes | ............. G06F 16/1727 |
| 11,062,228 | B2* | 7/2021 | Kim | ....................... G06N 20/00 |
| 2017/0083603 | A1* | 3/2017 | Minder | ............... G06F 11/1076 |
| 2019/0220363 | A1 | 7/2019 | Zhang et al. | |
| 2019/0324656 | A1 | 10/2019 | Xiao et al. | |

(Continued)

OTHER PUBLICATIONS

Yizong Cheng, "Mean Shift, Mode Seeking, and Clustering," IEEE Transactions on Pattern Analysis and Machine Intelligence, Aug. 1995. pp. 790-799, vol. 17, No. 8.

(Continued)

*Primary Examiner* — Irete F Ehichioya
*Assistant Examiner* — Shirley D Hicks
(74) *Attorney, Agent, or Firm* — Ryan, Mason & Lewis, LLP

(57) ABSTRACT

An apparatus comprises at least one processing device configured to collect, from a plurality of storage systems, data patterns for data stored in the plurality of storage systems and to cluster the plurality of storage systems into one or more data pattern sharing clusters based at least in part on the collected data patterns, a given one of the one or more data pattern sharing clusters comprising two or more of the plurality of storage systems. The at least one processing device is also configured to identify, for the given data pattern sharing cluster, a subset of the collected data patterns and to provide, to the two or more storage systems of the given data pattern sharing cluster, the identified subset of the data patterns, wherein the identified subset of the collected data patterns are utilized by the two or more storage systems in performing data deduplication.

20 Claims, 18 Drawing Sheets

(56) References Cited

U.S. PATENT DOCUMENTS

2020/0142628 A1 5/2020 Armangau et al.
2022/0027250 A1* 1/2022 Petaru ................ G06F 11/3414

OTHER PUBLICATIONS

Dell Technologies, "Dell EMC CloudIQ: A Detailed Review," Technical White Paper, Jun. 2020, 101 pgs.

* cited by examiner 601-1

DATA PATTERN NUMBERS, TOP 0-9 (P#)

| STORAGE SYSTEM (SS) | P#166 | P#991 | P#214 | P#880 | P#659 | P#805 | P#155 | P#252 | P#928 | P#310 |
|---|---|---|---|---|---|---|---|---|---|---|
| SS-1001 | 946 | 983 | 956 | 1253 | 1252 | 875 | 752 | 1243 | 887 | 1188 |
| SS-1002 | 998 | 877 | 1078 | 777 | 1160 | 1106 | 1266 | 892 | 1036 | 1159 |
| SS-1006 | 1046 | 1277 | 1244 | 793 | 888 | 992 | 915 | 1328 | 756 | 756 |
| SS-1010 | 966 | 893 | 1282 | 1099 | 792 | 1228 | 1019 | 922 | 954 | 921 |
| SS-1011 | 1526 | 1150 | 1089 | 1017 | 1169 | 812 | 1172 | 1225 | 1007 | 1144 |
| SS-1014 | 926 | 997 | 1340 | 880 | 1382 | 1107 | 992 | 981 | 970 | 990 |
| SS-1027 | 982 | 808 | 1238 | 1000 | 924 | 1109 | 774 | 1155 | 912 | 1151 |
| SS-1031 | 1169 | 1098 | 964 | 1201 | 866 | 748 | 1095 | 1078 | 1032 | 1254 |
| SS-1046 | 887 | 955 | 833 | 886 | 1090 | 1059 | 1262 | 1129 | 1114 | 745 |
| SS-1047 | 914 | 987 | 813 | 1125 | 1025 | 942 | 1089 | 841 | 996 | 942 |
| SS-1048 | 1148 | 1085 | 954 | 1212 | 717 | 842 | 913 | 858 | 1195 | 1098 |
| SS-1049 | 1043 | 1088 | 1218 | 1080 | 1155 | 957 | 977 | 1257 | 741 | 1005 |
| SS-1056 | 1113 | 1099 | 1150 | 678 | 889 | 1135 | 1073 | 786 | 865 | 929 |

FIG. 6A 601-2

| STORAGE SYSTEM (SS) | DATA PATTERN NUMBERS, TOP 0-9 (P#) | | | | | | | | | |
|---|---|---|---|---|---|---|---|---|---|---|
| | P#166 | P#991 | P#214 | P#880 | P#659 | P#805 | P#155 | P#252 | P#928 | P#310 |
| SS-1057 | 1157 | 983 | 1037 | 1014 | 1203 | 1035 | 938 | 874 | 804 | 1028 |
| SS-1058 | 762 | 1077 | 835 | 986 | 1037 | 897 | 837 | 744 | 981 | 1080 |
| SS-1064 | 1179 | 460 | 1064 | 1280 | 1068 | 1046 | 1197 | 1041 | 1111 | 1230 |
| SS-1066 | 1055 | 971 | 710 | 1162 | 1085 | 1140 | 1480 | 1094 | 1142 | 718 |
| SS-1073 | 1323 | 1018 | 1267 | 1119 | 1070 | 685 | 788 | 831 | 944 | 1164 |
| SS-1075 | 574 | 942 | 1187 | 760 | 1041 | 1044 | 981 | 767 | 1278 | 992 |
| SS-1082 | 1163 | 1179 | 1206 | 876 | 955 | 1420 | 1070 | 1021 | 1352 | 748 |
| SS-1086 | 802 | 1436 | 845 | 1192 | 1062 | 773 | 1335 | 1244 | 1153 | 1095 |
| SS-1087 | 1238 | 754 | 896 | 1103 | 1053 | 965 | 760 | 1152 | 952 | 1026 |
| SS-1089 | 1101 | 1347 | 1056 | 1115 | 794 | 1235 | 851 | 914 | 771 | 753 |
| SS-1092 | 565 | 1241 | 625 | 1065 | 1114 | 1019 | 1187 | 1160 | 1105 | 1104 |
| SS-1094 | 1324 | 1172 | 881 | 924 | 784 | 1358 | 795 | 877 | 1223 | 1011 |

FIG. 6B

| STORAGE SYSTEM (SS) | DATA PATTERN NUMBERS, TOP 330-339 (P#) | | | | | | | | | |
|---|---|---|---|---|---|---|---|---|---|---|
| | P#329 | P#10 | P#316 | P#8208 | P#409 | P#499 | P#296 | P#442 | P#747 | P#559 |
| SS-1001 | 779 | 776 | 569 | 667 | 850 | 454 | 598 | 763 | 360 | 608 |
| SS-1002 | 771 | 586 | 334 | 884 | 1003 | 848 | 647 | 426 | 715 | 726 |
| SS-1006 | 755 | 911 | 911 | 712 | 364 | 714 | 816 | 522 | 771 | 761 |
| SS-1010 | 976 | 766 | 756 | 579 | 599 | 467 | 327 | 836 | 608 | 1012 |
| SS-1011 | 713 | 1031 | 509 | 678 | 1031 | 700 | 1001 | 596 | 626 | 835 |
| SS-1014 | 443 | 550 | 817 | 299 | 498 | 850 | 855 | 673 | 810 | 570 |
| SS-1027 | 473 | 219 | 400 | 713 | 300 | 643 | 194 | 614 | 583 | 319 |
| SS-1031 | 375 | 842 | 954 | 674 | 707 | 539 | 435 | 952 | 629 | 424 |
| SS-1046 | 798 | 545 | 779 | 583 | 571 | 779 | 827 | 512 | 667 | 526 |
| SS-1047 | 784 | 781 | 409 | 298 | 631 | 702 | 517 | 564 | 648 | 574 |
| SS-1048 | 409 | 579 | 659 | 518 | 758 | 551 | 1007 | 810 | 719 | 665 |
| SS-1049 | 906 | 482 | 1134 | 851 | 690 | 584 | 312 | 15 | 586 | 902 |
| SS-1056 | 467 | 894 | 473 | 641 | 894 | 573 | 710 | 542 | 756 | 443 |

| STORAGE SYSTEM (SS) | DATA PATTERN NUMBERS, TOP 330-339 (P#) | | | | | | | | | |
|---|---|---|---|---|---|---|---|---|---|---|
| | P#329 | P#10 | P#316 | P#8208 | P#409 | P#499 | P#296 | P#442 | P#747 | P#559 |
| SS-1057 | 564 | 486 | 995 | 829 | 706 | 482 | 780 | 719 | 790 | 1083 |
| SS-1058 | 829 | 434 | 610 | 964 | 543 | 619 | 790 | 483 | 993 | 389 |
| SS-1064 | 777 | 855 | 620 | 638 | 632 | 602 | 612 | 638 | 658 | 936 |
| SS-1066 | 766 | 254 | 285 | 721 | 576 | 592 | 681 | 961 | 677 | 440 |
| SS-1073 | 562 | 706 | 571 | 502 | 428 | 682 | 429 | 650 | 670 | 756 |
| SS-1075 | 542 | 517 | 714 | 823 | 404 | 651 | 1210 | 1003 | 500 | 654 |
| SS-1082 | 817 | 813 | 745 | 624 | 727 | 429 | 599 | 854 | 745 | 728 |
| SS-1086 | 681 | 673 | 772 | 1097 | 744 | 660 | 561 | 1008 | 929 | 250 |
| SS-1087 | 443 | 717 | 576 | 677 | 762 | 1091 | 910 | 696 | 302 | 864 |
| SS-1089 | 825 | 799 | 537 | 356 | 197 | 974 | 649 | 654 | 377 | 637 |
| SS-1092 | 647 | 780 | 850 | 726 | 826 | 423 | 450 | 163 | 623 | 741 |
| SS-1094 | 594 | 580 | 595 | 506 | 982 | 901 | 591 | 849 | 708 | 575 |

| STORAGE SYSTEM (SS) | DATA PATTERN NUMBERS, TOP 660-669 (P#) | | | | | | | | |
|---|---|---|---|---|---|---|---|---|---|
| | P#935 | P#24 | P#816 | P#501 | P#691 | P#525 | P#370 | P#99 | P#492 | P#514 |
| SS-1001 | 293 | 620 | 313 | 537 | 108 | 472 | 255 | 282 | 80 | 412 |
| SS-1002 | 281 | 203 | 205 | 280 | 426 | 460 | 486 | 665 | 53 | 360 |
| SS-1006 | 203 | 40 | 706 | 126 | 19 | 311 | 41 | 149 | 97 | 476 |
| SS-1010 | 458 | 386 | 377 | 581 | 194 | 103 | 19 | 181 | 308 | 566 |
| SS-1011 | 380 | 291 | 493 | 389 | 379 | 380 | 297 | 183 | 170 | 61 |
| SS-1014 | 264 | 482 | 445 | 517 | 319 | 365 | 368 | 543 | 436 | 636 |
| SS-1027 | 584 | 299 | 279 | 685 | 337 | 612 | 281 | 566 | 308 | 250 |
| SS-1031 | 374 | 359 | 601 | 288 | 821 | 296 | 418 | 34 | 255 | 116 |
| SS-1046 | 180 | 430 | 80 | 439 | 390 | 263 | 89 | 66 | 520 | 455 |
| SS-1047 | 54 | 706 | 322 | 282 | 236 | 218 | 459 | 172 | 547 | 245 |
| SS-1048 | 142 | 300 | 363 | 408 | 78 | 476 | 546 | 226 | 404 | 298 |
| SS-1049 | 523 | 271 | 661 | 85 | 308 | 514 | 30 | 103 | 601 | 468 |
| SS-1056 | 283 | 650 | 327 | 370 | 570 | 378 | 605 | 154 | 359 | 471 |

| STORAGE SYSTEM (SS) | DATA PATTERN NUMBERS, TOP 660-669 (P#) | | | | | | | | | |
|---|---|---|---|---|---|---|---|---|---|---|
| | P#935 | P#24 | P#816 | P#501 | P#691 | P#525 | P#370 | P#99 | P#492 | P#514 |
| SS-1057 | 469 | 568 | 407 | 635 | 551 | 465 | 543 | 565 | 553 | 357 |
| SS-1058 | 275 | 385 | 355 | 423 | 432 | 236 | 227 | 356 | 184 | 342 |
| SS-1064 | 593 | 466 | 215 | 249 | 407 | 690 | 305 | 472 | 336 | 137 |
| SS-1066 | 385 | 386 | 357 | 120 | 214 | 262 | 638 | 545 | 272 | 392 |
| SS-1073 | 774 | 381 | 272 | 301 | 520 | 228 | 299 | 514 | 204 | 181 |
| SS-1075 | 622 | 12 | 221 | 24 | 465 | 221 | 83 | 540 | 558 | 457 |
| SS-1082 | 285 | 319 | 399 | 751 | 394 | 233 | 649 | 569 | 300 | 355 |
| SS-1086 | 159 | 128 | 427 | 656 | 377 | 273 | 137 | 322 | 485 | 598 |
| SS-1087 | 384 | 471 | 57 | 128 | 673 | 405 | 454 | 282 | 237 | 287 |
| SS-1089 | 43 | 316 | 318 | 139 | 100 | 111 | 384 | 238 | 696 | 268 |
| SS-1092 | 641 | 277 | 98 | 160 | 296 | 260 | 366 | 503 | 380 | 86 |
| SS-1094 | 279 | 180 | 615 | 194 | 190 | 554 | 779 | 520 | 388 | 451 |

| STORAGE SYSTEM (SS) | DATA PATTERN NUMBERS, TOP 990-999 (P#) | | | | | | | | | |
|---|---|---|---|---|---|---|---|---|---|---|
| | P#728 | P#461 | P#226 | P#467 | P#574 | P#4 | P#511 | P#46 | P#406 | P#998 |
| SS-1001 | 69 | 45 | 57 | 89 | 45 | 215 | 271 | 198 | 5 | 178 |
| SS-1002 | 24 | 305 | 159 | 52 | 222 | 42 | 5 | 339 | 16 | 82 |
| SS-1006 | 4 | 11 | 269 | 19 | 87 | 257 | 291 | 45 | 0 | 55 |
| SS-1010 | 59 | 200 | 40 | 108 | 19 | 254 | 97 | 328 | 124 | 127 |
| SS-1011 | 87 | 105 | 0 | 97 | 77 | 151 | 5 | 9 | 335 | 353 |
| SS-1014 | 67 | 42 | 54 | 122 | 275 | 22 | 5 | 94 | 179 | 9 |
| SS-1027 | 463 | 123 | 240 | 10 | 37 | 34 | 60 | 44 | 41 | 230 |
| SS-1031 | 12 | 270 | 16 | 289 | 120 | 123 | 54 | 40 | 120 | 48 |
| SS-1046 | 155 | 158 | 36 | 75 | 123 | 63 | 117 | 90 | 169 | 43 |
| SS-1047 | 24 | 107 | 107 | 123 | 105 | 249 | 28 | 96 | 21 | 31 |
| SS-1048 | 59 | 455 | 251 | 140 | 198 | 112 | 263 | 103 | 30 | 85 |
| SS-1049 | 91 | 68 | 118 | 271 | 290 | 194 | 28 | 26 | 75 | 51 |
| SS-1056 | 76 | 172 | 92 | 12 | 87 | 143 | 34 | 119 | 72 | 149 |

FIG. 6G

| STORAGE SYSTEM (SS) | DATA PATTERN NUMBERS, TOP 990-999 (P#) | | | | | | | | | |
|---|---|---|---|---|---|---|---|---|---|---|
| | P#728 | P#461 | P#226 | P#467 | P#574 | P#4 | P#511 | P#46 | P#406 | P#998 |
| SS-1057 | 222 | 119 | 18 | 6 | 403 | 31 | 135 | 126 | 50 | 64 |
| SS-1058 | 214 | 356 | 63 | 20 | 127 | 52 | 35 | 12 | 53 | 9 |
| SS-1064 | 61 | 16 | 261 | 213 | 11 | 115 | 156 | 209 | 165 | 30 |
| SS-1066 | 127 | 0 | 471 | 152 | 44 | 70 | 68 | 14 | 38 | 166 |
| SS-1073 | 232 | 38 | 73 | 162 | 173 | 299 | 244 | 35 | 235 | 49 |
| SS-1075 | 1 | 35 | 239 | 178 | 163 | 5 | 123 | 18 | 23 | 50 |
| SS-1082 | 41 | 40 | 186 | 397 | 93 | 109 | 10 | 450 | 84 | 78 |
| SS-1086 | 128 | 254 | 114 | 303 | 88 | 62 | 127 | 68 | 132 | 11 |
| SS-1087 | 377 | 62 | 23 | 18 | 159 | 107 | 544 | 132 | 321 | 160 |
| SS-1089 | 203 | 84 | 11 | 77 | 11 | 63 | 266 | 176 | 127 | 139 |
| SS-1092 | 224 | 129 | 91 | 168 | 140 | 226 | 59 | 175 | 211 | 120 |
| SS-1094 | 255 | 77 | 194 | 74 | 53 | 84 | 8 | 32 | 61 | 253 |

CLUSTERING STORAGE SYSTEMS FOR SHARING OF DATA PATTERNS USED FOR DEDUPLICATION

RELATED APPLICATION

The present application claims priority to Chinese Patent Application No. 202011461983.0, filed on Dec. 9, 2020 and entitled "Clustering Storage Systems for Sharing of Data Patterns Used for Deduplication," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, the storage controllers implement functionality for various data services including data deduplication functionality.

SUMMARY

Illustrative embodiments of the present invention provide techniques for clustering storage systems for sharing of data patterns used for performing deduplication on the storage systems.

In one embodiment, an apparatus comprises at least one processing device comprising a processor coupled to a memory. The at least one processing device is configured to perform the steps of collecting, from a plurality of storage systems, data patterns for data stored in the plurality of storage systems, and clustering the plurality of storage systems into one or more data pattern sharing clusters based at least in part on the collected data patterns, a given one of the one or more data pattern sharing clusters comprising two or more of the plurality of storage systems. The at least one processing device is also configured to perform the steps of identifying, for the given data pattern sharing cluster, a subset of the collected data patterns, and providing, to the two or more storage systems of the given data pattern sharing cluster, the identified subset of the data patterns, wherein the identified subset of the collected data patterns are utilized by the two or more storage systems in performing data deduplication.

These and other illustrative embodiments include, without limitation, methods, apparatus, networks, systems and processor-readable storage media.

BRIEF DESCRIPTION OF THE DRAWINGS

FIGS. 6A-6H show tables of data pattern frequencies for storage systems in a cluster in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
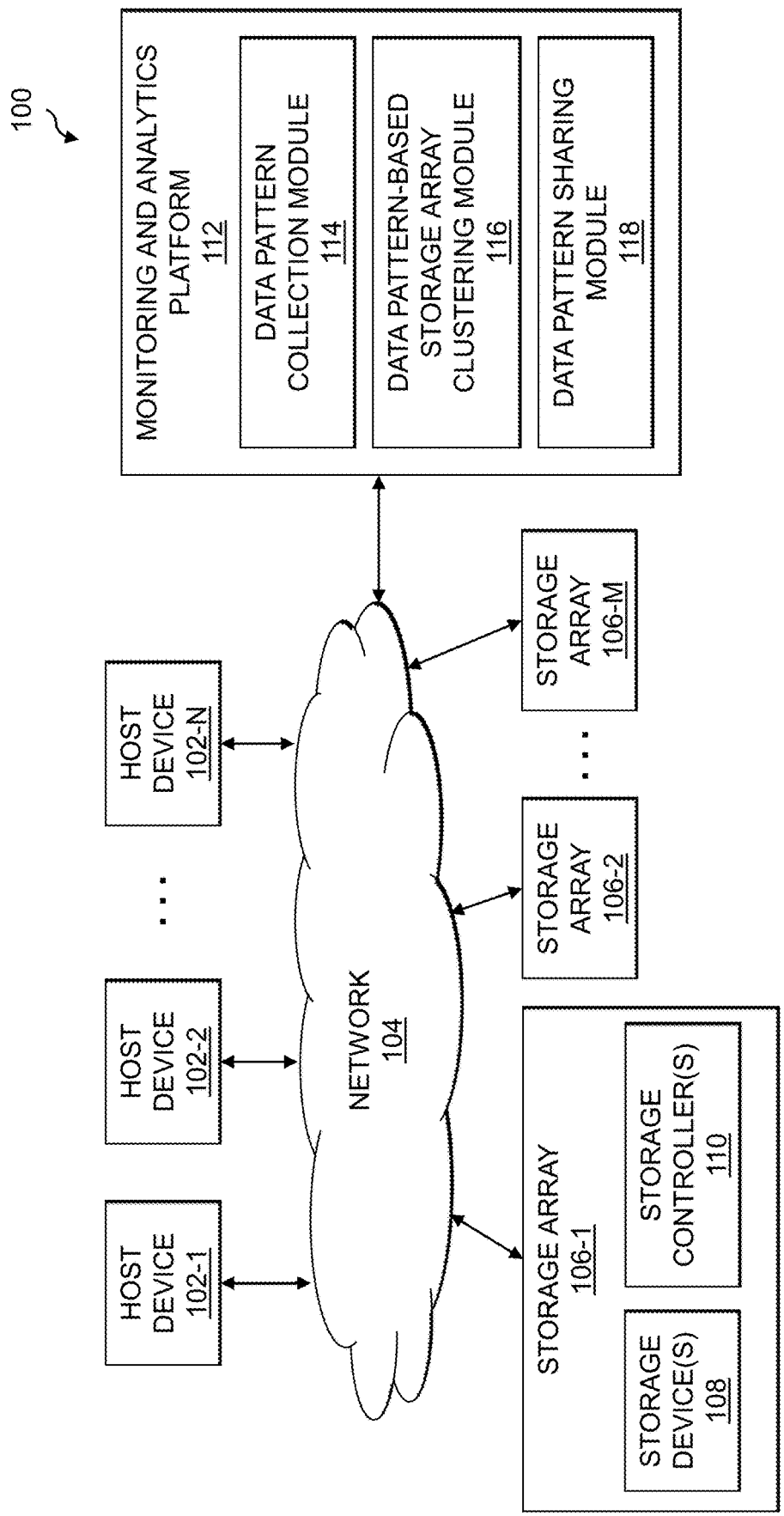
FIG. 1 is a block diagram of an information processing system for clustering storage systems for sharing of data patterns used for performing deduplication on the storage systems in an illustrative embodiment of the invention.

FIG. 1 shows an information processing system 100 configured in accordance with an illustrative embodiment to provide functionality for clustering storage systems for sharing of data patterns used for performing deduplication on the storage systems. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to submit IO operations to be processed by the storage arrays 106. The storage controller of the storage arrays 106 (e.g., the storage controllers 110 of storage array 106-1) are assumed to implement deduplication functionality for data that is to be stored on storage devices (e.g., storage devices 108 of the storage array 106-1). Data from IO requests submitted by the host devices 102 may be temporarily stored in a memory or cache (e.g., a memory or write cache that is part of or accessible to the storage controllers 110). Once deduplicated, data is stored on the storage device 108. The deduplication functionality may be implemented using or based on recognizing data patterns in the data to be stored. The information processing system 100 further includes a monitoring and analytics platform 112 that is configured to provide functionality for recognizing private data patterns (e.g., for individual ones of the storage arrays, for individual storage devices of individual ones of the storage arrays), and to cluster the storage arrays 106 (or storage devices thereof) based on the data patterns. The monitoring and analytics platform 112 is also configured to share selected ones of those private data patterns across the storage arrays 106 (or storage devices thereof) so as to improve data deduplication performance.

The monitoring and analytics platform 112 includes a data pattern collection module 114, a data pattern-based storage array clustering module 116, and a data pattern sharing module 118. The data pattern collection module 114 is configured to collecting, from the storage arrays 106, data patterns for data stored in the storage arrays 106. The data pattern-based storage array clustering module 116 is configured to cluster the storage arrays 106 into one or more data pattern sharing clusters based at least in part on the collected data patterns, a given one of the one or more data pattern sharing clusters comprising two or more of the storage arrays 106. The data pattern sharing module 118 is configured to identify, for the given data pattern sharing cluster, a subset of the collected data patterns. The data pattern sharing module 118 is also configured to provide the identified subset of the collected data patterns to the storage arrays 106 that are part of the given data pattern sharing cluster. The identified subset of the collected data patterns are utilized by the storage arrays 106 in the data pattern sharing cluster to perform data deduplication.

At least portions of the functionality of the data pattern collection module 114, the data pattern-based storage array clustering module 116 and the data pattern sharing module 118 may be implemented at least in part in the form of software that is stored in memory and executed by a processor.

Although shown as external to the host devices 102 and storage arrays 106 in the FIG. 1 embodiment, it should be appreciated that the monitoring and analytics platform 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and monitoring and analytics platform 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the monitoring and analytics platform 112 may be implemented on respective distinct processing platforms, although numerous other arrangements are possible. For example, in some embodiments at least portions of one or more of the host devices 102, the storage arrays 106 and the monitoring and analytics platform 112 are implemented on the same processing platform. The monitoring and analytics platform 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the monitoring and analytics platform 112 may be implemented at least in part in the first geographic location, the second geographic location, and one or more other geographic locations. Thus, it is possible in some implementations of the system 100 for different ones of the host devices 102, the storage arrays 106 and the monitoring and analytics platform 112 to reside in different data centers.

Numerous other distributed implementations of the host devices 102, the storage array 106 and the monitoring and analytics platform 112 are possible. Accordingly, the host devices 102, the storage array 106 and the monitoring and analytics platform 112 can also be implemented in a distributed manner across multiple data centers.

Additional examples of processing platforms utilized to implement portions of the system 100 in illustrative embodiments will be described in more detail below in conjunction with FIGS. 7 and 8.

It is to be understood that the particular set of elements shown in FIG. 1 for clustering storage systems for sharing of data patterns used for performing deduplication on the storage systems is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for clustering storage systems for sharing of data patterns used for performing deduplication on the storage systems will now be described in more detail with reference to the flow diagram of FIG. 2. It is to be understood that this particular process is only an example, and that additional or alternative processes for clustering storage systems for sharing of data patterns used for performing deduplication on the storage systems may be used in other embodiments.

In this embodiment, the process includes steps 200 through 206. These steps are assumed to be performed by the monitoring and analytics platform 102 utilizing the data pattern collection module 114, the data pattern-based storage array clustering module 116, and the data pattern sharing module 118. The process begins with step 200, collecting, from a plurality of storage systems (e.g., storage arrays 106), data patterns for data stored in the plurality of storage systems. Step 200 may include collecting, from each of the plurality of storage systems, a designated number of most frequently occurring data patterns for data stored in that storage system.

In step 202, the plurality of storage systems are clustered into one or more data pattern sharing clusters based at least in part on the collected data patterns. A given one of the one or more data pattern sharing clusters comprises two or more of the plurality of storage systems. Step 202 may utilize a mean-shift clustering algorithm. The mean-shift clustering algorithm may utilize multidimensional scaling to achieve dimensionality reduction for the collected data patterns. The multidimensional scaling may take as input a first data structure with entries characterizing a frequency of observation of each of the collected data patterns on each of the plurality of storage systems and provide as output a second data structure that projects the frequency of observation of each of the collected data patterns from a first dimension to a second dimension lower than the first dimension. The mean-shift clustering algorithm may produce a data structure that tags ones of the plurality of storage systems with labels corresponding to ones of the one or more data pattern sharing clusters to which the plurality of storage systems belong.

Figure 2:
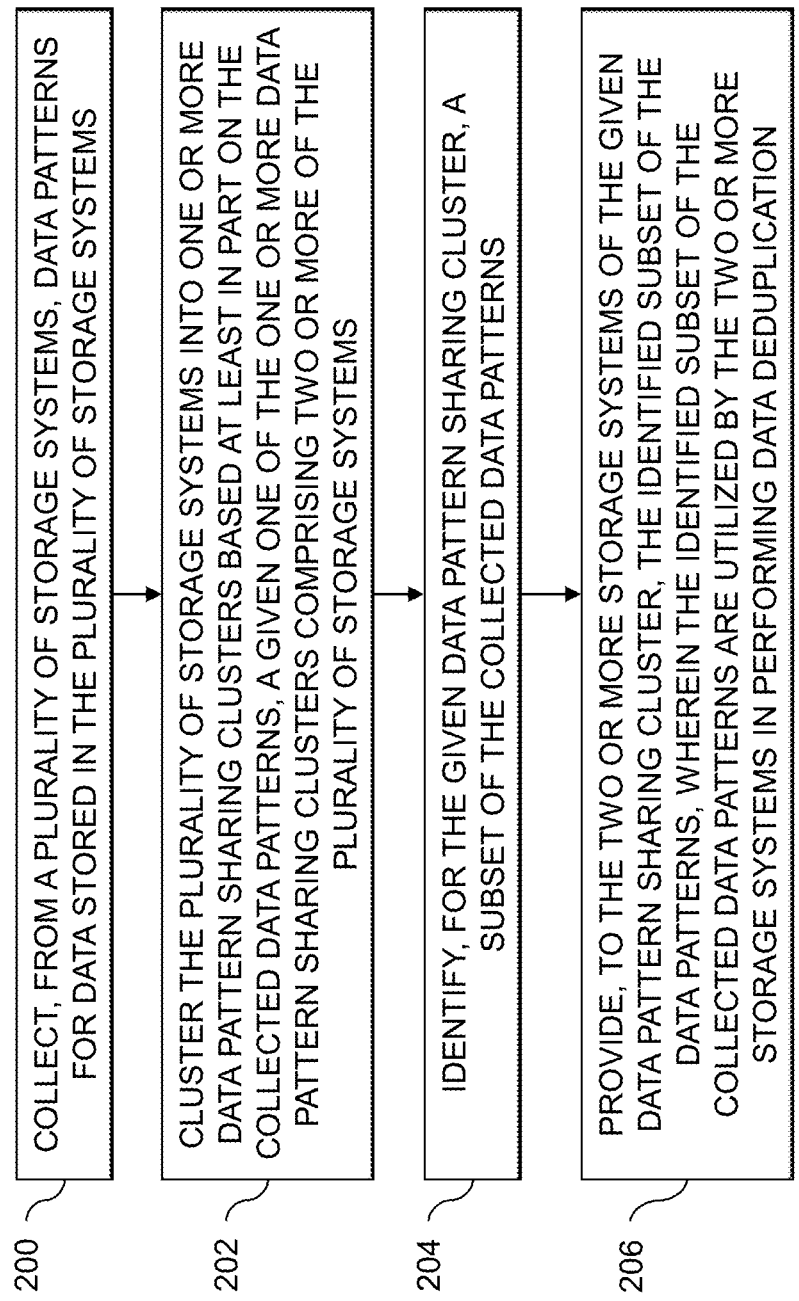
FIG. 2 is a flow diagram of an exemplary process for clustering storage systems for sharing of data patterns used for performing deduplication on the storage systems in an illustrative embodiment.

The FIG. 2 process continues with step 204, identifying, for the given data pattern sharing cluster, a subset of the collected data patterns. Step 204 may be based at least in part on frequencies of occurrence of the collected data patterns in each of the two or more storage systems of the given data pattern sharing cluster. In step 206, the identified subset of patterns are provided to the two or more storage systems of the given data pattern sharing cluster. The identified subset of the collected data patterns are utilized by the two or more storage systems in performing data deduplication. The two or more storage systems may implement inline pattern detection (ILPD) for performing data deduplication, the ILPD utilizing the identified subset of the collected data patterns. The ILPD of a given one of the two or more storage systems may utilize a set of predefined data patterns, the identified subset of the collected data patterns comprising at least one data pattern not in the set of predefined data patterns.

In some embodiments, step 200 includes generating a first data structure with entries denoting a frequency at which each of the collected data patterns is observed on each of the plurality of storage systems over a given time period. Step 202 may include taking as input the first data structure and producing a second data structure that tags the entries of the first data structure for each of the plurality of storage system with labels corresponding to ones of the one or more data pattern sharing clusters to which the plurality of storage systems belong. Step 204 may include sorting the collected data patterns based at least in part on mean frequency of occurrence across the two or more storage systems in the given data pattern sharing cluster and selecting a designated number of the collected data patterns having a highest mean frequency of occurrence across the two or more storage systems in the given data pattern sharing cluster as the subset of the collected data patterns for the given data pattern sharing cluster.

Illustrative embodiments provide intelligent mechanisms for collecting and sharing private data patterns among storage systems using a monitoring and analytics platform (e.g., the platform 102 shown in FIG. 1). As noted above, the monitoring an analytics platform may be cloud-based, such as a Dell EMC CloudIQ platform. Some embodiments use shared private data patterns to enhance the pre-defined patterns used for ILPD in the storage systems, which efficiently improves data reduction performance and provides corresponding space saving benefits.

Data deduplication is a process for eliminating duplicate copies of repeating data. Data deduplication processes may be used to improve storage utilization. ILPD is a type of data deduplication process that is particularly efficient and economic. ILPD significantly reduces the raw storage capacity needed in a storage system, since the full and not-yet-deduplicated data is not written from a short-term or intermediate storage (e.g., memory, a cache) to long-term storage (e.g., a disk). ILPD also advantageously reduces time to disaster recovery readiness, because the storage system does not need to wait to absorb the entire data set and then deduplicate it before the storage system can begin replicating to a remote site. As a kind of deduplication, ILPD implements inline pattern detection and zero detection capability that can recognize a set of static, predefined data patterns as they get written to provisioned objects. The storage system implementing ILPD detects the predefined data patterns in memory, and should not allocate any space on disk for data matching the predefined data patterns. Instead, only metadata needs to be updated on detecting a match to the predefined data patterns.

Monitoring and analytics platforms, as noted above, may be cloud-based. For example, CloudIQ provides proactive monitoring and analytics functionality for storage systems. CloudIQ advantageously provides a Software-as-a-Service (SaaS) solution, enabling delivery of frequent, dynamic and non-disruptive content updates for end-users. Further, CloudIQ is built in a secure multi-tenant platform to ensure that each customer or other end-user tenant is properly isolated and secure from other end-users. Once storage systems establish a connection to CloudIQ, regular data (e.g., alerts, performance information, etc.) updates may be collected. Such collected data may be used to drive value, such as in leveraging advanced analytics powered by machine learning to deliver higher uptime, increase performance, perform effective capacity planning, etc.

In some storage systems, data pattern definitions for ILPD are hardcoded in source code of the storage systems. Thus, storage systems that server different end-users around the world may use the same predefined patterns that are fixed and non-scalable. However, from the end-user's perspective, deduplication performance will be efficiently improved if customized data patterns could be detected and applied to ILPD. End-users, however, may deploy a number of different storage systems, including possible storage systems of different types. There may be some common data patterns across such different storage systems, but there is no mechanism for associating different storage systems for common data pattern collection and sharing. In addition, data patterns may be multifarious on the end-user side, and thus it is difficult to determine whether data patterns are common enough such that sharing the data patterns would provide worthwhile improvements to ILPD performance. Advantageously, a monitoring and analytics platform, such as the CloudIQ platform suitable modified to incorporate the functionality described herein, may be used as a centralized service for data pattern collection, analysis and sharing across different storage systems. The storage systems managed by the monitoring and analytics platform will be intelligently congregated into groups based on data pattern similarity to make sure that the data patterns are valuable and warrant sharing.

Figure 3:
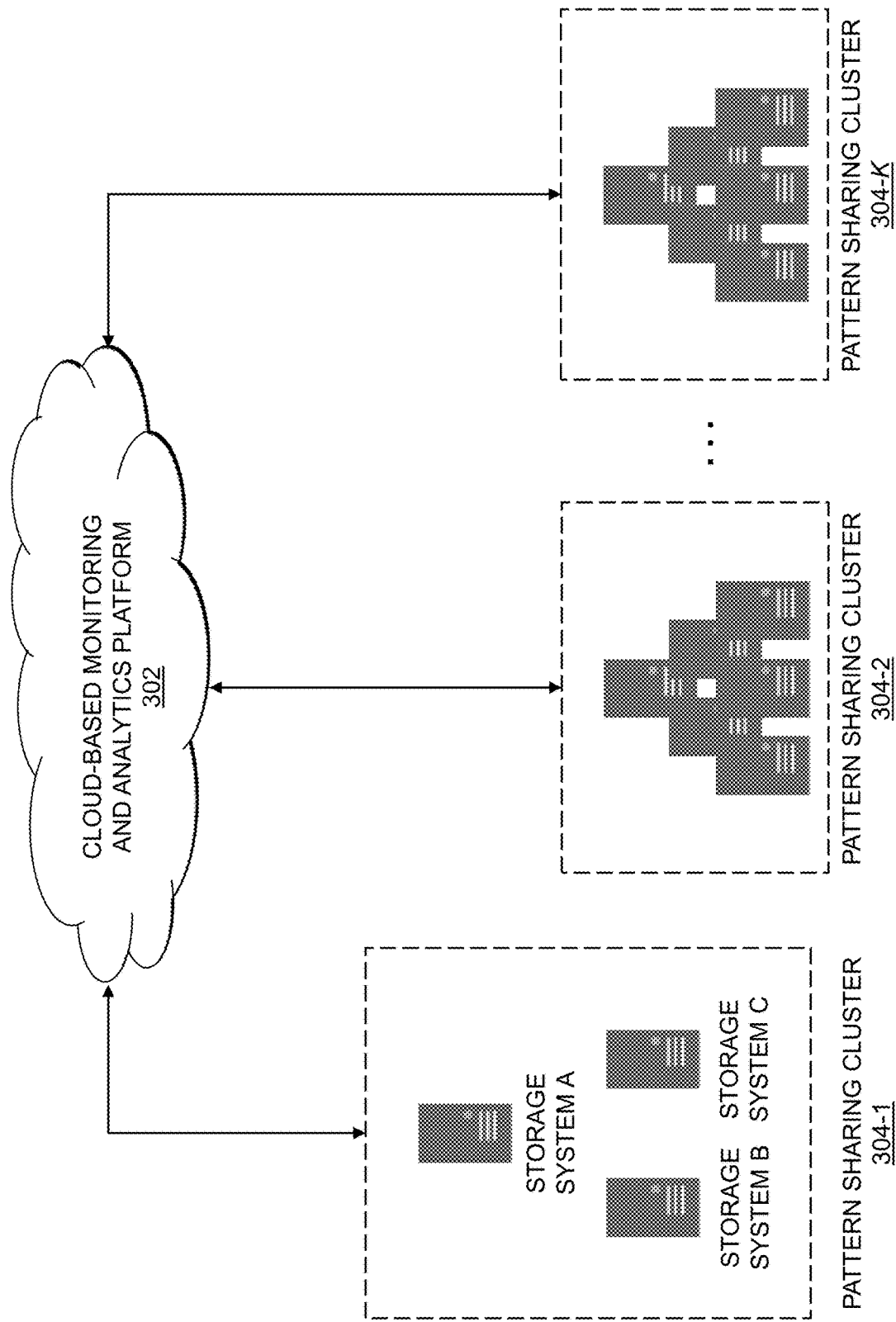
FIG. 3 shows a cloud-based monitoring and analytics platform monitoring data patterns for different pattern sharing clusters of storage systems in an illustrative embodiment.

FIG. 3 shows a cloud-based monitoring and analytics platform 302, which may comprise a CloudIQ platform suitable modified to provide the functionality described herein (e.g., functionality of the monitoring and analytics platform 102 described above). In the FIG. 3 example, the cloud-based monitoring and analytics platform 302 is connected to different pattern sharing clusters 304-1, 304-2, . . . 304-K (collectively, pattern sharing clusters 304). Here, K denotes the number of clusters generated using a clustering algorithm (e.g., a Mean-Shift clustering algorithm) described in further detail below. As shown in FIG. 3, the pattern sharing cluster 304-1 includes a set of storage systems denoted Storage System A, Storage System B and Storage System C. The number of storage systems in a cluster is denoted i, and may vary for different clusters. In the FIG. 3 example, i=3 for pattern sharing cluster 304-1. It should be appreciated, however, that different clusters may have different values of i (e.g., more or fewer than three). Different ones of the pattern sharing clusters 304 may include different numbers of storage systems.

The cloud-based monitoring and analytics platform 302 advantageously implements an intelligent data pattern sharing mechanism as described herein for collecting and sharing private data patterns among storage systems (e.g., such as the Storage Systems A-C of pattern sharing cluster 304-1) for use in applying ILPD. The storage systems are congregated by the similarity of "hot" data patterns for sharing, as illustrated by the pattern sharing clusters 304 of FIG. 3. In this way, the predefined data patterns in a particular storage system (e.g., Storage System A in pattern sharing cluster 304-1) are expanded to efficiently increase the ratio of detected data patterns in ILPD to provide improvements in data reduction performance for space saving on that storage system.

Figure 4:
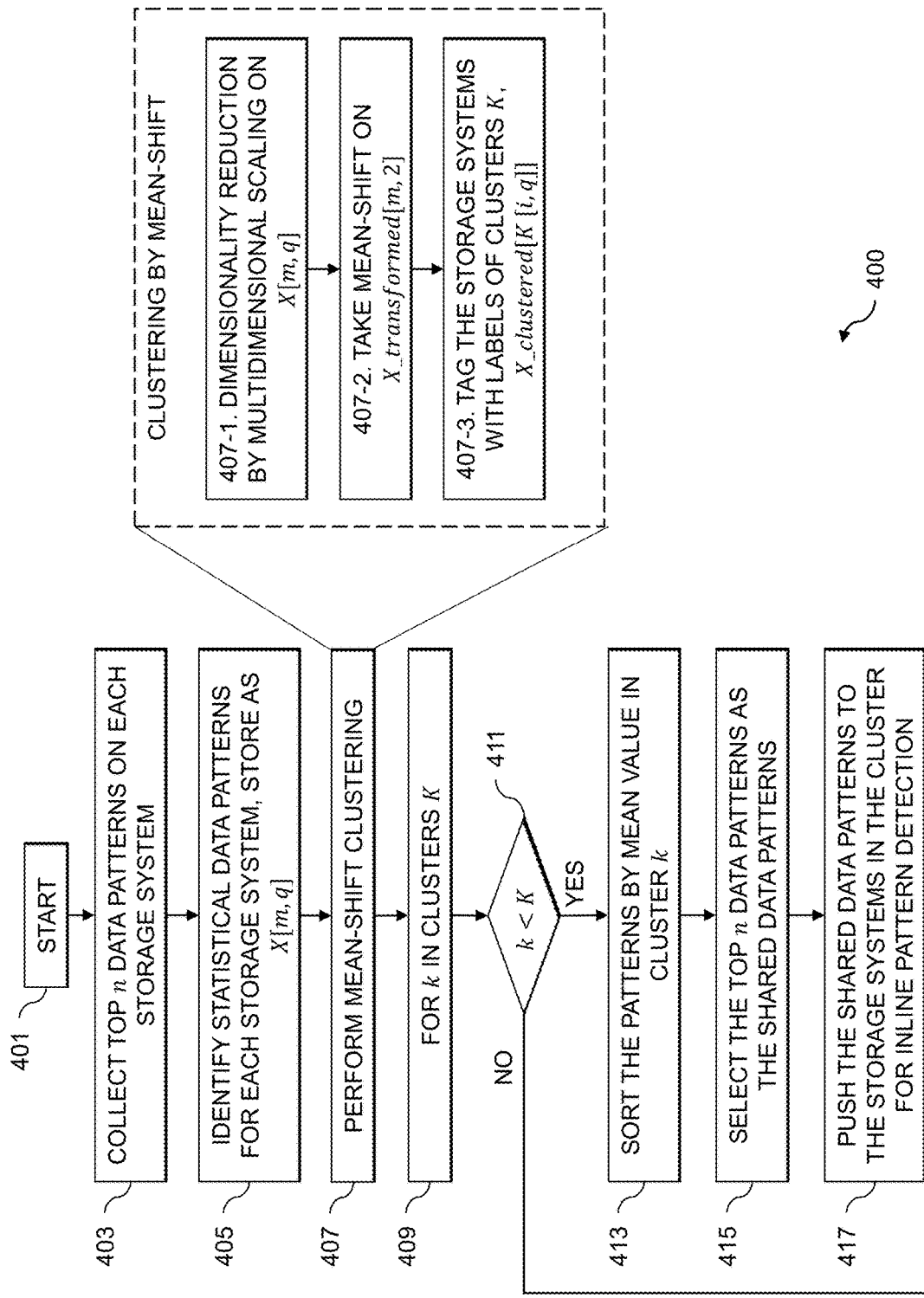
FIG. 4 shows a process flow for determining data pattern sharing for clusters of storage systems in an illustrative embodiment.

FIG. 4 shows a process flow 400 for implementing the intelligent data pattern sharing mechanism in the cloud-based monitoring and analytics platform 302. The process flow 400 starts in step 401, and in step 403 performs data collection. The data collection step 403 includes collecting the top n data patterns on each storage system, with m denoting the number of storage systems. The top n data patterns are the "hot" data patterns for each storage system. n may be predefined, or may be an end-user configurable parameter. The data collection step 403 may be performed regularly, such as daily, weekly, etc., in response to an explicit request for data collection, in response to detecting some threshold change in use of the storage systems, etc. In step 405, statistical data patterns are identified for each storage system. Such data patterns are stored as $X[m, q]$, which denotes an m×q matrix for data pattern frequency of storage systems.

In step 407, mean-shift clustering is used to cluster the storage systems, taking data pattern frequency as the clustering features. Although various embodiments are described with respect to use of mean-shift clustering, it should be appreciated that various other clustering algorithms may be used. In some embodiments, mean-shift clustering is used as the clustering algorithm since there is no pre-known number of clusters in various end-user production environments and mean-shift clustering enables automatic generation of clusters in such scenarios. As discussed above, in step 405 statistical data patterns are identified for each of the storage systems, and are stored as an m×q matrix: $X[m, q]$ representing the "hottest" or most used data patterns.

The mean-shift clustering in step 407 may be broken down into sub-steps 407-1 through 407-3. In step 407-1, dimensionality reduction is performed by MDS on $X[m, q]$:

$$X\_transformed[m,2]=MDS(X[m,q],2)$$

The MDS projects data to a lower dimension, such that data points that are close to each other (e.g., such as in terms of Euclidean distance) in the higher dimension are close in the lower dimension as well. Thus, the reduced matrix $X\_transformed[m, 2]$ would not lose the feature, but efficiently improves clustering performance in the next step 407-2. In step 407-2, mean-shift is taken on $X\_transformed[m, 2]$. The mean-shift clustering produces K clusters. In step 407-3, the storage systems are tagged with the labels of the clusters K, X_clustered[K,[i, q]]. X_clustered[K,[i, q]] denotes an array for data pattern frequency of the clustered storage systems.

The process 400 continues with step 409, where for k in clusters K, the processing of steps 411 through 419 are performed. In step 411, a determination is made as to whether k<K. If the result of the step 411 determination is yes, processing proceeds to step 413 where the data patterns are sorted by mean value in cluster k. In step 415, the top n data patterns are selected as the shared data patterns. The shared data patterns selected in step 415 are pushed to the storage systems in the cluster for ILPD in step 417. The process 400 then ends in step 419. If the result of the step 411 determination is no, the process 400 also ends in step 419. The steps 411 through 419 may be iterated for all of the clusters K.

A simulation of the process 400 will now be described, where the value of m (e.g., the number of storage systems is 100, with identifiers (IDs) of SS-1000 through SS-1099. The number n of data patterns is 1000. For simplicity in the simulation, it is assumed that the 1000 patterns are the same across all 100 storage systems. The IDs of the data patterns are P #0 through P #999. The number q of unique data patterns is also 1000. In the simulation, two groups of pattern frequency data are prepared for the clustering, Group 1 and Group 2. For Group 1, data is generated around several specified center points. For Group 2, data is generated randomly.

Figure 5A:
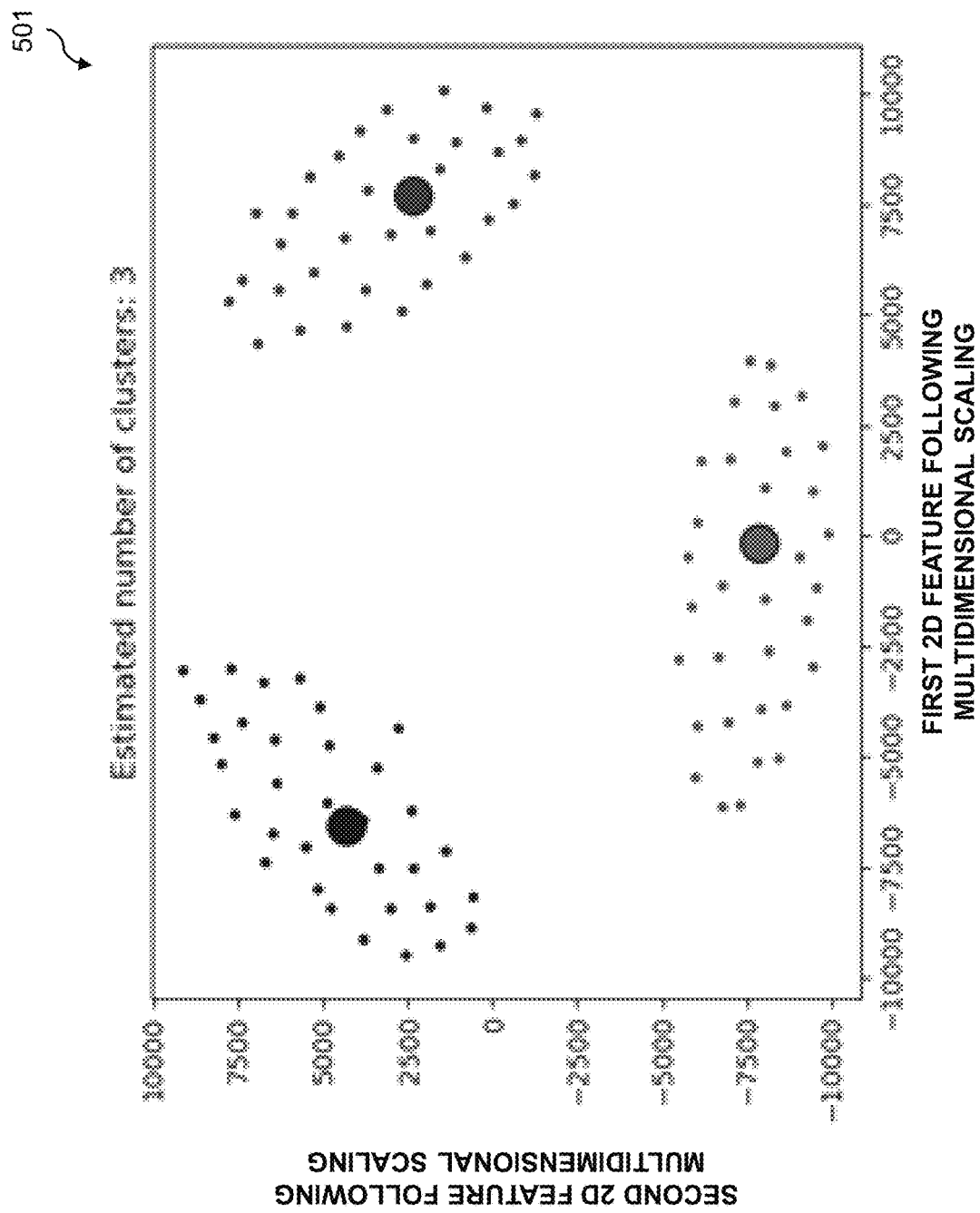
FIGS. 5A-5D show clustering results for storage systems using mean-shift clustering in an illustrative embodiment.
Figure 5B:
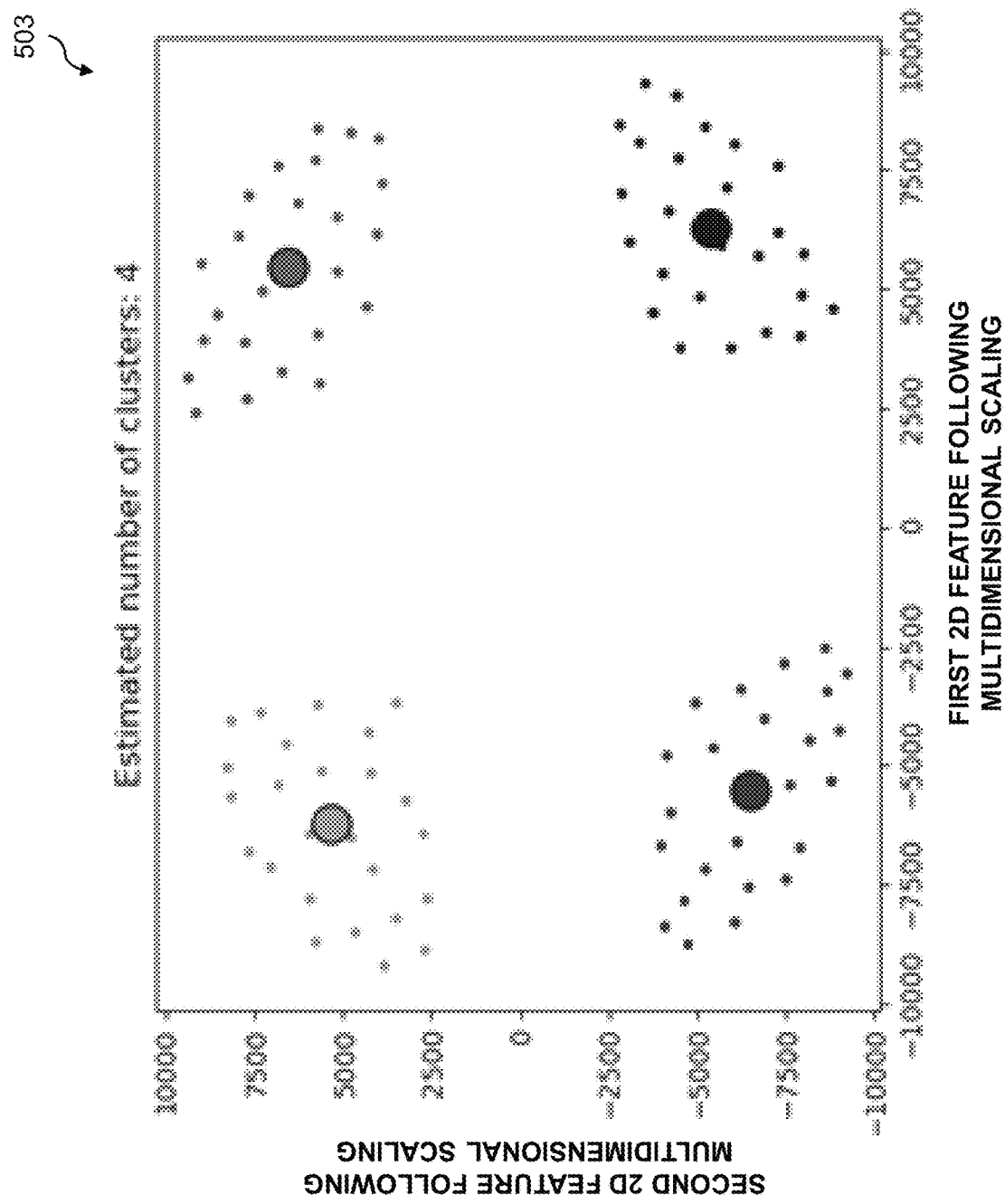
Figure 5C:
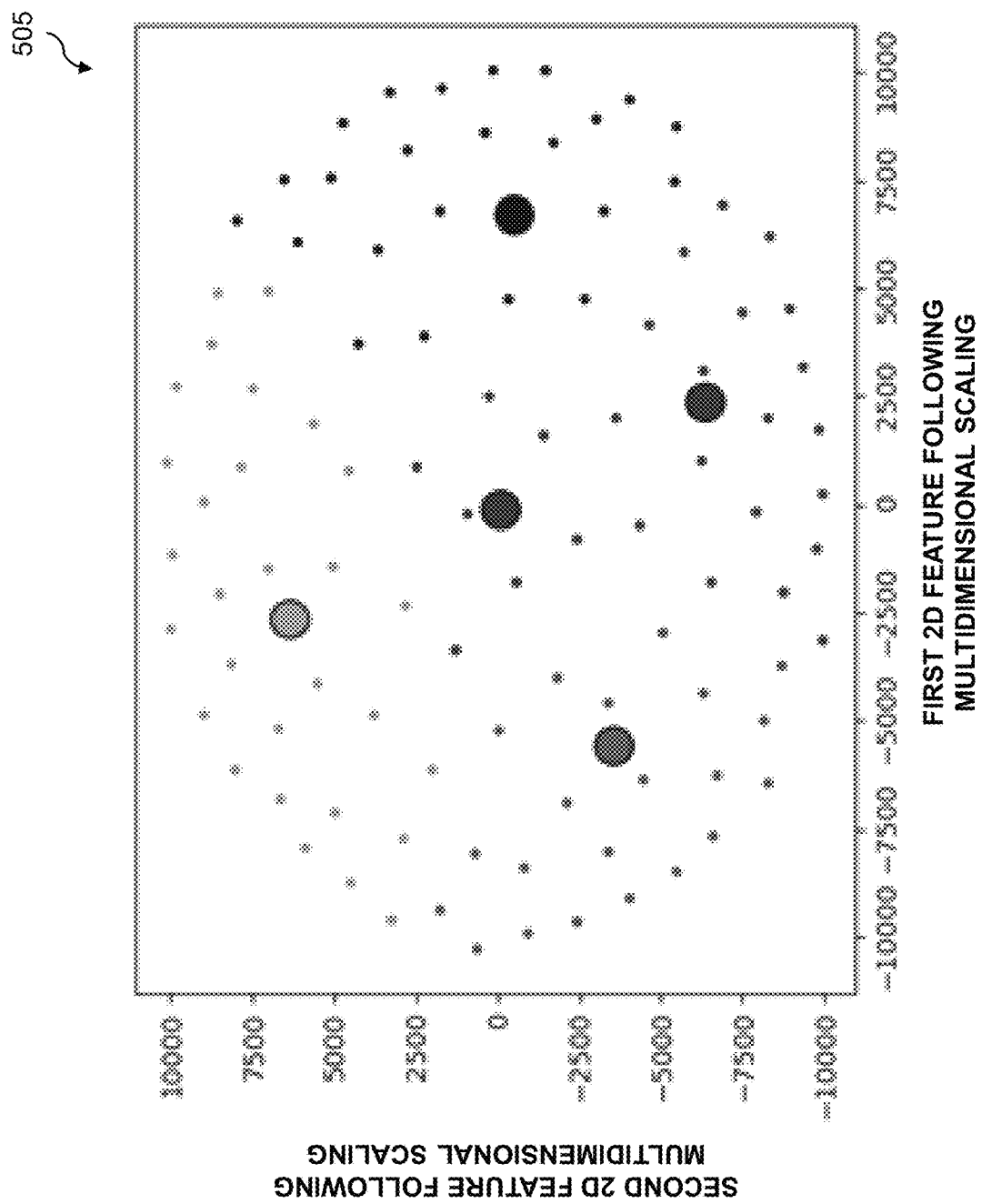
Figure 5D:
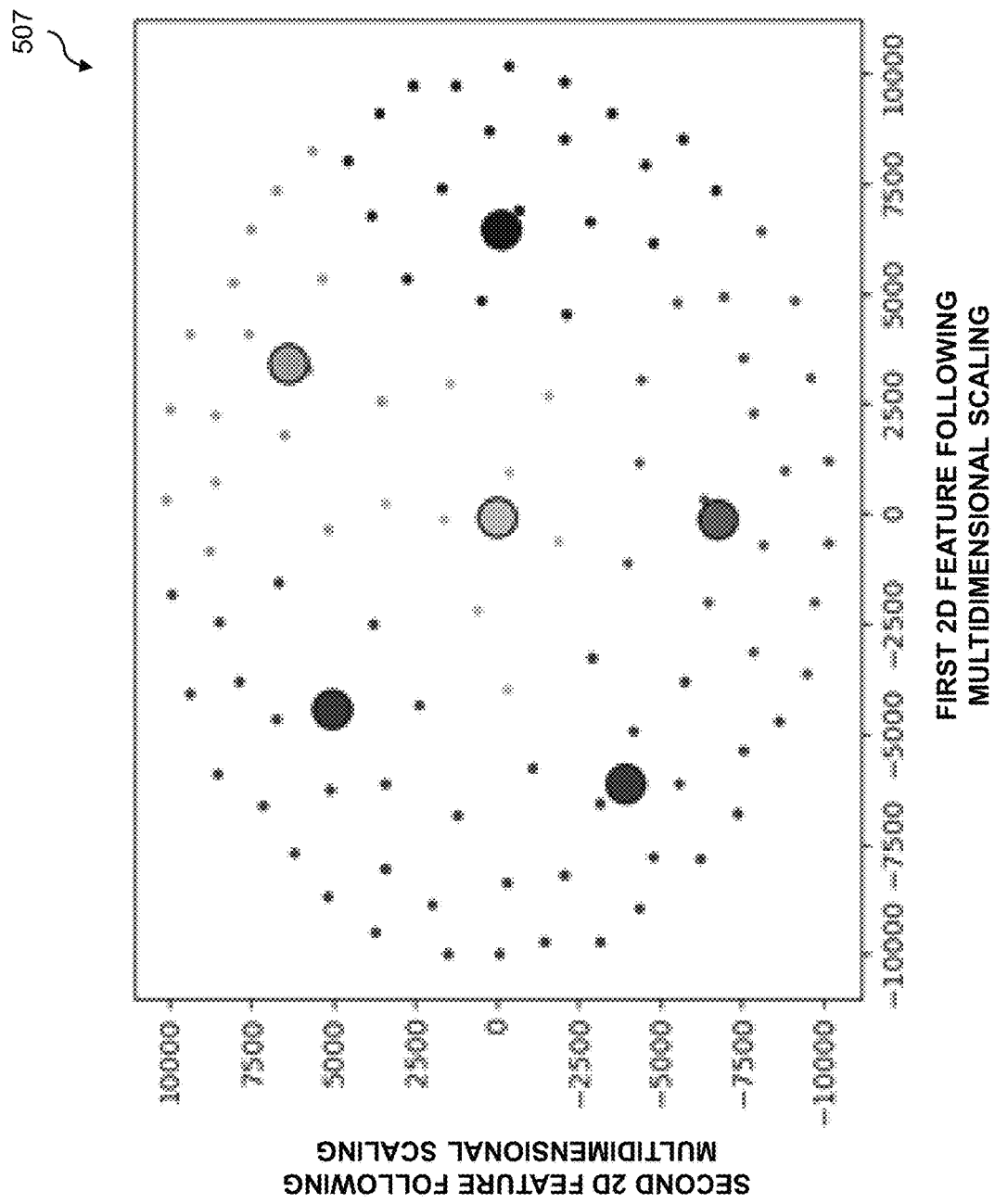
Figure 6C:
Figure 6E:

FIGS. 5A-5D show the 100 storage systems clustered by mean-shift in both situations (e.g., Group 1 and Group 2). More particularly, FIGS. 5A and 5B show respective plots 501 and 503 with the clustering results for Group 1 and FIGS. 5C and 5D show respective plots 505 and 507 with the clustering results for Group 2. In plot 503 of FIG. 5B, for example, the 100 storage systems are congregated into four clusters (denoted 0, 1, 2 and 3). Consider cluster 0 for further analysis. The 1000 data patterns are sorted by mean value in the cluster 0, and four periods (e.g., Top 0-9, Top 330-339, Top 660-669, and Top 990-999) are sampled. FIGS. 6A-6H illustrate the pattern frequency of the storage systems in cluster 0 for such different periods. More particularly, FIGS. 6A and 6B show respective portions 601-1 and 601-2 (collectively, table 601) for the Top 0-9, FIGS. 6C and 6D show respective portions 603-1 and 603-2 (collectively, table 603) for the Top 330-339, FIGS. 6E and 6F show respective portions 605-1 and 605-2 (collectively, table 605) for the Top 660-669, and FIGS. 6G and 6H show respective portions 607-1 and 607-2 (collectively, table 607) for the Top 990-999. As illustrated in the tables 601 and 607, the storage systems have higher data pattern frequency for the Top 0-9 data patterns and lower data pattern frequency for the Top 990-999 data patterns. Thus, a cluster of these 100 storage systems, the hot data patterns would be common enough and valuable for sharing.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for clustering storage systems for sharing of data patterns used for performing deduplication on the storage systems will now be described in greater detail with reference to FIGS. 7 and 8. Although described in the context of system 100, these platforms may also be used to implement at least portions of other information processing systems in other embodiments.

Figure 7:
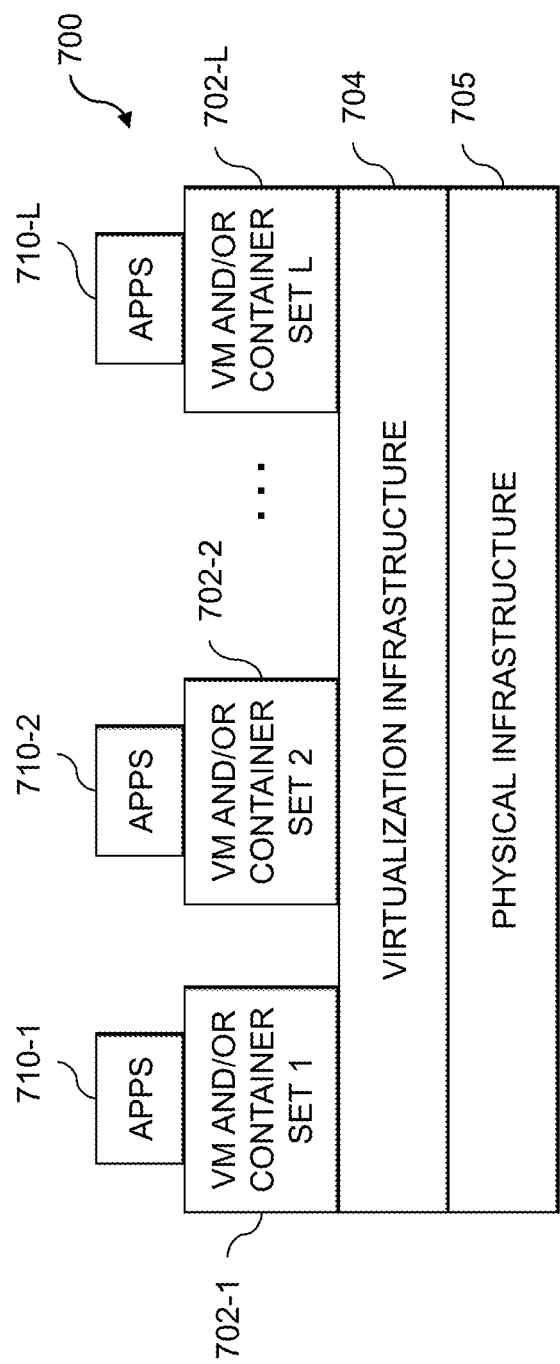
FIGS. 7 and 8 show examples of processing platforms that may be utilized to implement at least a portion of an information processing system in illustrative embodiments.
Figure 8:
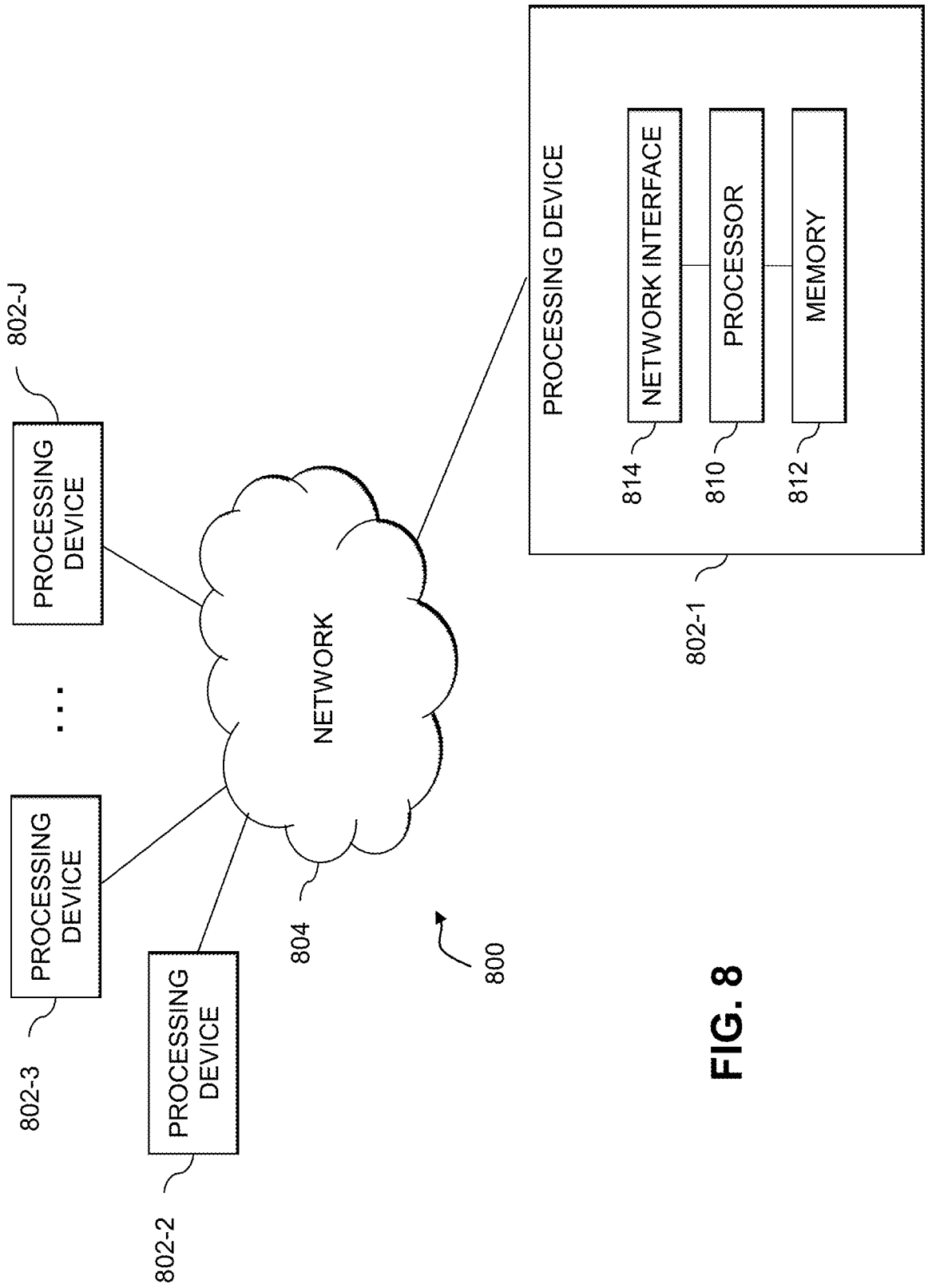

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-J, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for clustering storage systems for sharing of data patterns used for performing deduplication on the storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, clustering algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
collecting, from a plurality of storage systems, data patterns for data stored in the plurality of storage systems;
clustering the plurality of storage systems into two or more data pattern sharing clusters based at least in part on the collected data patterns, a first one of the two or more data pattern sharing clusters comprising a first subset of two or more of the plurality of storage systems, a second one of the two or more data pattern sharing clusters comprising a second subset of two or more of the plurality of storage systems, the second subset being different than the first subset;
identifying, for the first and second data pattern sharing clusters, respective first and second subsets of the collected data patterns, the second subset of the collected data patterns being different than the first subset of the collected data patterns;
providing the first subset of the collected data patterns to the two or more storage systems of the first data pattern sharing cluster, wherein the first subset of the collected data patterns are utilized by the two or more storage systems in the first data pattern sharing cluster for performing data deduplication; and
providing the second subset of the collected data patterns to the two or more storage systems of the second data pattern sharing cluster, wherein the second subset of the collected data patterns are utilized by the two or more storage systems in the second data pattern sharing cluster for performing data deduplication;
wherein identifying the first subset of the collected data patterns comprises selecting, for inclusion in the first subset of the collected data patterns, at least one data pattern collected from data deduplication software running on at least one of the two or more storage systems of the first data pattern sharing cluster which is not utilized by data deduplication software running on at least one of the two or more storage systems of the second data pattern sharing cluster.

2. The apparatus of claim 1 wherein the two or more storage systems in the first data pattern sharing cluster implement inline pattern detection for performing data deduplication, the inline pattern detection utilizing the first subset of the collected data patterns.

3. The apparatus of claim 2 wherein the inline pattern detection of a given one of the two or more storage systems in the first data pattern sharing cluster utilizes a set of predefined data patterns, the first subset of the collected data patterns comprising at least one data pattern not in the set of predefined data patterns.

4. The apparatus of claim 1 wherein collecting the data patterns comprises collecting, from each of the plurality of storage systems, a designated number of most frequently occurring data patterns for data stored in that storage system.

5. The apparatus of claim 1 wherein clustering the plurality of storage systems into the two or more data pattern sharing clusters comprises utilizing a mean-shift clustering algorithm.

6. The apparatus of claim 5 wherein the mean-shift clustering algorithm utilizes multidimensional scaling to achieve dimensionality reduction for the collected data patterns.

7. The apparatus of claim 6 wherein the multidimensional scaling takes as input a first data structure with entries characterizing a frequency of observation of each of the collected data patterns on each of the plurality of storage systems and provides as output a second data structure that projects the frequency of observation of each of the collected data patterns from a first dimension to a second dimension lower than the first dimension.

8. The apparatus of claim 6 wherein the mean-shift clustering algorithm produces a data structure that tags ones of the plurality of storage systems with labels corresponding to ones of the two or more data pattern sharing clusters to which the plurality of storage systems belong.

9. The apparatus of claim 1 wherein collecting the data patterns comprises generating a first data structure with entries denoting a frequency at which each of the collected data patterns is observed on each of the plurality of storage systems over a given time period.

10. The apparatus of claim 9 wherein clustering the plurality of storage systems takes as input the first data structure and produces a second data structure that tags the entries of the first data structure for each of the plurality of storage system with labels corresponding to ones of the two or more data pattern sharing clusters to which the plurality of storage systems belong.

11. The apparatus of claim 10 wherein identifying the first subset of the collected data patterns for the first data pattern sharing cluster comprises sorting the collected data patterns based at least in part on mean frequency of occurrence across the two or more storage systems in the first data pattern sharing cluster and selecting a designated number of the collected data patterns having a highest mean frequency of occurrence across the two or more storage systems in the first data pattern sharing cluster as the first subset of the collected data patterns for the first data pattern sharing cluster.

12. The apparatus of claim 1 wherein identifying the first subset of the collected data patterns for the first data pattern sharing cluster is based at least in part on frequencies of occurrence of the collected data patterns in each of the two or more storage systems of the first data pattern sharing cluster.

13. The apparatus of claim 1 wherein the at least one processing device is part of a monitoring and analytics platform external to the plurality of storage systems.

14. The apparatus of claim 13 wherein the monitoring and analytics platform comprises a cloud-based monitoring and analytics platform.

15. A computer program product comprising a non-transitory processor-readable storage medium having stored therein program code of one or more software programs, wherein the program code when executed by at least one processing device causes the at least one processing device to perform steps of:
collecting, from a plurality of storage systems, data patterns for data stored in the plurality of storage systems;
clustering the plurality of storage systems into two or more data pattern sharing clusters based at least in part on the collected data patterns, a first one of the two or more data pattern sharing clusters comprising a first subset of two or more of the plurality of storage systems, a second one of the two or more data pattern sharing clusters comprising a second subset of two or more of the plurality of storage systems, the second subset being different than the first subset;
identifying, for the first and second data pattern sharing clusters, respective first and second subsets of the collected data patterns, the second subset of the collected data patterns being different than the first subset of the collected data patterns;
providing the first subset of the collected data patterns to the two or more storage systems of the first data pattern sharing cluster, wherein the first subset of the collected data patterns are utilized by the two or more storage systems in the first data pattern sharing cluster for performing data deduplication; and
providing the second subset of the collected data patterns to the two or more storage systems of the second data pattern sharing cluster, wherein the second subset of the collected data patterns are utilized by the two or more storage systems in the second data pattern sharing cluster for performing data deduplication;
wherein identifying the first subset of the collected data patterns comprises selecting, for inclusion in the first subset of the collected data patterns, at least one data pattern collected from data deduplication software running on at least one of the two or more storage systems of the first data pattern sharing cluster which is not utilized by data deduplication software running on at least one of the two or more storage systems of the second data pattern sharing cluster.

16. The computer program product of claim 15 wherein the two or more storage systems in the first data pattern sharing cluster implement inline pattern detection for performing data deduplication, the inline pattern detection utilizing the first subset of the collected data patterns.

17. The computer program product of claim 16 wherein the inline pattern detection of a given one of the two or more storage systems in the first data pattern sharing cluster utilizes a set of predefined data patterns, the first subset of the collected data patterns comprising at least one data pattern not in the set of predefined data patterns.

18. A method comprising:
collecting, from a plurality of storage systems, data patterns for data stored in the plurality of storage systems;
clustering the plurality of storage systems into two or more data pattern sharing clusters based at least in part on the collected data patterns, a first one of the two or more data pattern sharing clusters comprising a first subset of two or more of the plurality of storage systems, a second one of the two or more data pattern sharing clusters comprising a second subset of two or more of the plurality of storage systems, the second subset being different than the first subset;
identifying, for the first and second data pattern sharing clusters, respective first and second subsets of the collected data patterns, the second subset of the collected data patterns being different than the first subset of the collected data patterns;
providing the first subset of the collected data patterns to the two or more storage systems of the first data pattern sharing cluster, wherein the first subset of the collected data patterns are utilized by the two or more storage systems in the first data pattern sharing cluster for performing data deduplication; and providing the second subset of the collected data patterns to the two or more storage systems of the second data pattern sharing cluster, wherein the second subset of the collected data patterns are utilized by the two or more storage systems in the second data pattern sharing cluster for performing data deduplication;

wherein identifying the first subset of the collected data patterns comprises selecting, for inclusion in the first subset of the collected data patterns, at least one data pattern collected from data deduplication software running on at least one of the two or more storage systems of the first data pattern sharing cluster which is not utilized by data deduplication software running on at least one of the two or more storage systems of the second data pattern sharing cluster; and wherein the method is performed by at least one processing device comprising a processor coupled to a memory.

19. The method of claim 18 wherein the two or more storage systems in the first data pattern sharing cluster implement inline pattern detection for performing data deduplication, the inline pattern detection utilizing the first subset of the collected data patterns.

20. The method of claim 19 wherein the inline pattern detection of a given one of the two or more storage systems in the first data pattern sharing cluster utilizes a set of predefined data patterns, the first subset of the collected data patterns comprising at least one data pattern not in the set of predefined data patterns.

\* \* \* \* \*